United States Patent
Anzai (10) Patent No.: US 8,606,328 B2
(45) Date of Patent: Dec. 10, 2013

(54) MOBILE COMMUNICATION TERMINAL AND MENU DISPLAY METHOD IN THE SAME

(75) Inventor: Takeshi Anzai, Saitama (JP)

(73) Assignee: NEC Corporation, Tokyo (JP)

( * ) Notice: Subject to any disclaimer, the term of this patent is extended or adjusted under 35 U.S.C. 154(b) by 238 days.

(21) Appl. No.: 12/738,876

(22) PCT Filed: Sep. 22, 2008

(86) PCT No.: PCT/JP2008/067057
§ 371 (c)(1),
(2), (4) Date: Apr. 20, 2010

(87) PCT Pub. No.: WO2009/069370
PCT Pub. Date: Jun. 4, 2009

(65) Prior Publication Data
US 2010/0222113 A1     Sep. 2, 2010

(30) Foreign Application Priority Data
Nov. 28, 2007   (JP) ................................. 2007-306820

(51) Int. Cl.
*H04M 1/00* (2006.01)
*H04B 1/38* (2006.01)

(52) U.S. Cl.
USPC .......................................... 455/566; 715/700

(58) Field of Classification Search
USPC ........... 455/556, 550.1, 557; 710/18; 715/700
See application file for complete search history.

(56) References Cited

U.S. PATENT DOCUMENTS

| 7,237,240 B1 | 6/2007 | Chen et al. | |
| 2004/0070591 A1 | 4/2004 | Kato | |
| 2005/0149511 A1 | 7/2005 | Ruthfield et al. | |
| 2006/0218499 A1 | 9/2006 | Matthews et al. | |
| 2008/0034128 A1* | 2/2008 | Evans | 710/18 |
| 2008/0177994 A1* | 7/2008 | Mayer | 713/2 |

FOREIGN PATENT DOCUMENTS

| CN | 1820248 A | 8/2006 |
| JP | 6-152497 A | 5/1994 |
| JP | 6-350757 A | 12/1994 |
| JP | 2003273999 A | 9/2003 |
| JP | 2004102609 A | 4/2004 |
| JP | 2005229310 A | 8/2005 |
| JP | 2006039615 A | 2/2006 |

OTHER PUBLICATIONS

International Search Report for PCT/JP2008/067057 mailed Oct. 21, 2008.
Chinese Office Action for CN200880118193.3 dated Aug. 14, 2012.
The Extended European Search Report for EP Application No. 08854207.1 dated on Jun. 4, 2013.

* cited by examiner

*Primary Examiner* — Christian Hannon (57) ABSTRACT

A mobile communication terminal according to the present invention includes: a related-function associate unit that associates an function executed by a user operation with a function executed next by the user operation after executing the executed function; a weighting set unit that sets a larger weighting value to a newer combination of the executed function and the next executed function associated by the related-function associate unit, and a next function predict function that causes the next executed function having a larger weighting value set by the weighting set unit to be preferentially displayed from among the next executed functions associated with the executed function when a function is newly selected by the user.

6 Claims, 7 Drawing Sheets

| EXECUTED FUNCTION | NEXT EXECUTED FUNCTION | WEIGHTING VALUE |
|---|---|---|
| FUNCTION 1 | FUNCTION 1 | y 1 |
| | FUNCTION 2 | y 2 |
| | FUNCTION 3 | y 3 |
| | FUNCTION 4 | y 4 |
| | FUNCTION 5 | y 5 |
| | FUNCTION 6 | y 6 |
| | END | y 7 |
| FUNCTION 2 | FUNCTION 1 | y 8 |
| | FUNCTION 2 | y 9 |
| | FUNCTION 3 | y 10 |
| | FUNCTION 4 | y 11 |
| | FUNCTION 5 | y 12 |
| | FUNCTION 6 | y 13 |
| | END | y 14 |
| ⋮ | ⋮ | ⋮ |

$y\,6 = (N-3) + (N-10) + (N-15)$ $y\,7 = (N-2) + \cdots$ $y\,14 = (N-4) + \cdots$

MOBILE COMMUNICATION TERMINAL AND MENU DISPLAY METHOD IN THE SAME

TECHNICAL FIELD

The invention relates to a mobile communication terminal in which a menu is displayed for the user to select a function that the user wants to execute from functions installed in the mobile communication terminal, and a menu display method in the mobile communication terminal.

BACKGROUND ART

Recently, while convenience is further required in the mobile communication terminal such as a mobile phone or the like, a variety of installed functions tends to widen. However, because a display screen in the mobile communication terminal is not so large, it is difficult to display plural items to select the functions as a single list in the display screen at sight. Therefore, the technique has been known in which the items to be selected are hierarchically-designed, and displayed from upper layered items to lower layered items. By tracking down a desired item through the hierarchical menu, the user can select the desired item among the number of items and thereby instruct the mobile communication terminal to execute the desired item. On the other hand, while the variety of the installed functions becomes wide, the user does not evenly use over the installed functions, and therefore a frequently-executed function can be specified for each user. Therefore, the mobile communication terminal which is configured to display the frequently-executed function among the plural items on a priority basis for each user has been known.

Patent document 1 discloses a technique in which a selecting frequency of each displayed items is administrated with respect to the layered menus. By giving the priority to each item according to the administrated frequency, the items are displayed in the descending order of the priority in the display screen. In this way, the function which the user frequently uses in daily can be preferentially displayed in the menu as the predicted function which is predicted to be selected next. Hereinafter, the predicted function is also called a related-function. Patent document 2 discloses a technique in which a series of items which are selected by the user are memorized. Specifically, the items which are selected firstly and secondary are memorized in sequence. After the frequency of selecting the sequence items is compared with a predetermined criterion, the items which are selected with high frequency in the past are preferentially displayed to a display unit. In this way, without repeatedly selecting the items in each layer from a first menu display, the user can easily find the desired item by selecting the series of items which are preferentially displayed.

The techniques relating to the mobile communication terminal and the menu display method as described above are also disclosed in Patent document 3 and Patent document 4 or the like.

[Patent Document I]
Japanese Unexamined Patent Application Publication No. 2004-102609
[Patent Document 2]
Japanese Unexamined Patent Application Publication No. 2005-229310
[Patent Document 3]
Japanese Unexamined Patent Application Publication No. 2006-39615
[Patent Document 4]
Japanese Unexamined Patent Application Publication No. 6-152497

DISCLOSURE OF INVENTION

Technical Problem

However, in the mobile communication terminal disclosed in Patent documents 1 to 4, the items having high frequencies are preferentially displayed according to only a number of selecting times by the user in the predetermined period. Therefore, in the known mobile communication terminal, the related-functions are not necessarily displayed in response to a latest user's usability. For example, when one related-function is frequently used in the past and is not used within recent days, the related-function which the user does not need is preferentially displayed. In this way; because the related-functions which the user wants to select are not necessarily displayed preferentially in the known mobile communication terminal, a usability is poor.

An object of the present invention is to provide a mobile communication terminal displaying the menu having a fine usability for the user.

Technical Solution

One aspect of the present invention is a mobile communication terminal including a related-function associate unit that associates a function executed by a user operation with a function executed next by the user operation; a weighting set unit that sets a larger weighting value to a newer combination of the executed function and the next executed function associated by the related-function associate unit; and a next function predict unit that, when a function is newly selected by the user, causes the next executed function having a larger weighting value set by the weighting set unit to be preferentially displayed from among the next executed functions associated with the executed function.

Another aspect of the present invention is a menu display method of a mobile communication terminal including associating an executed function by a user operation with an executed function executed next by the user operation; setting a larger weighting value to a newer combination of the executed function and the next executed function; and causing the next executed function having a larger weighting value to be preferentially among the next executed functions associated with the executed function when a function is newly selected by the user.

Advantageous Effects

The mobile communication terminal according to the present invention can display the menu having a fine usability for the user.

EXPLANATION OF REFERENCE

1 MOBILE COMMUNICATION TERMINAL
2 DISPLAY UNIT
2a POP-UP WINDOW
3 KEY INTERFACE UNIT
4 RADIO UNIT
5 VOLTAGE SOURCE UNIT
6 CONTROL UNIT
8 MEMORY
10 RELATED-FUNCTION ASSOCIATE UNIT
11 NEXT FUNCTION PREDICT UNIT
12 WEIGHTING SET UNIT
13 ASSOCIATION NUMBER SETTING UNIT
14 WEIGHTING VALUE CALCULATE UNIT

BEST MODE FOR CARRYING OUT THE INVENTION

Hereinafter, embodiments of the present invention will be described with reference to the attached drawings.

[Embodiment]

Figure 1:
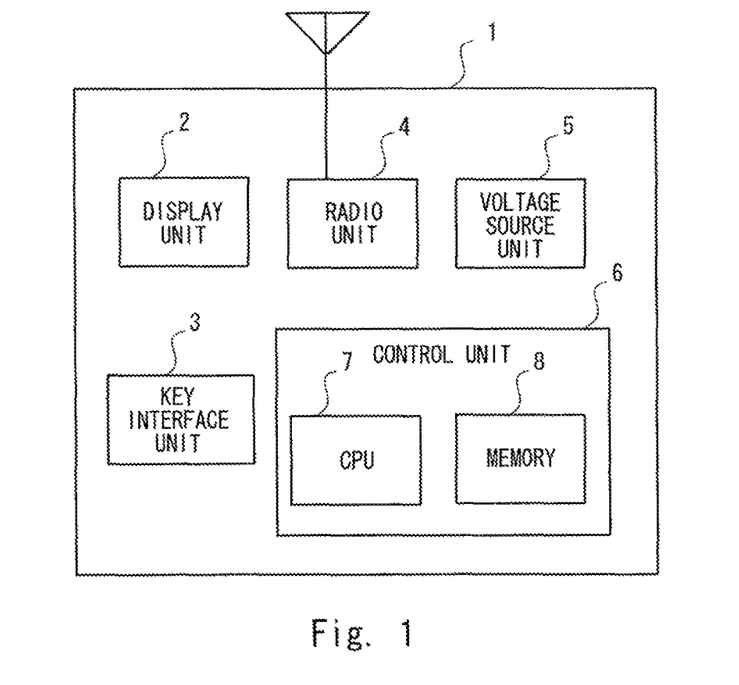
FIG. 1 is a diagram showing an exemplary overall configuration of a mobile communication terminal according to an embodiment of the present invention.

FIG. 1 is a diagram showing an exemplary overall configuration of a mobile communication terminal according to an embodiment of the present invention. As shown in FIG. 1, the mobile communication terminal 1 includes a display unit 2, a key interface unit 3, a radio unit 4, a voltage source unit 5, and a control unit 6. Further, the control unit 6 includes a CPU 7 and a memory 8. For example, the mobile communication terminal 1 is a mobile phone, a PHS (Personal Handy-phone System), a PDA (Personal Data Assistance) or the like. Here, the mobile phone will be explained as the mobile communication terminal 1 for instance.

The display unit 2 displays letters, symbols or the like, and is configured to give the user visual information. For example, the display unit 2 is composed of a LCD (Liquid Crystal Display). The display unit 2 displays letters, numbers, symbols or the like, which the user enters to the mobile communication terminal by using the key interface unit. The display unit 2 displays items for the user so that the user can select a function installed in the mobile communication terminal 1. Here, the functions are a camera function, a e-mail creating function, a ring alert selecting function, a ring volume setting function or the like, which are preliminary installed in the mobile communication terminal 1. In the mobile communication terminal 1, the items that are used by the user to select the above functions are configured hierarchically. For example, in the case where the e-mail function, the camera function, and an address book function, or the like are provided as upper layered functions, a e-mail creating function, a received e-mail browsing function, a sent e-mail browsing function or the like are further provided as lower layered functions for the upper layered function of the e-mail function.

The key interface unit 3 is an interface for accepting an entry of numbers and letters entered by the user, and for selecting the functions displayed in the display unit 2. The key interface unit 3 is constructed with provide plural keys. The user can enter any numbers or letters to the mobile communication terminal 1 by selecting and pushing appropriate keys among the plural keys. By selecting an item indicating a given function with the key interface unit 3 while checking the menu displayed in the display unit 2, the user can instruct the mobile communication unit 1 to execute the given function. The item selected by the user by using the interface unit 3 is transmitted to the control unit 6.

The radio unit 4 communicates with an external network and a communication terminal. The radio unit 4 receives radio data from the external network and the communication terminal, and transmits transmit data generated as the radio data by the control unit 6. The voltage source unit 5 is configured to supply electric power to various devices installed in the mobile communication terminal 1. The control unit 6 receives data accepted in the radio unit 4, generates data to be transmitted from the radio unit 4, and outputs the data to the radio unit 4. The data accepted in the radio unit 4 is sequentially memorized in the memory 8. The control unit 6 causes the display unit 2 to display a variety of functions installed in the mobile communication terminal 1 in a display method as will be described later. The memory 8 is configured to memorize the received and transmitted data, a record of the function executed by the control unit 6, and the like. When the user newly selects any one function, the control unit 6 causes the display unit 2 to display the items which are highly possible to be selected based on data about functions which are executed in the past, which is stored in the memory 8.

Figure 2:
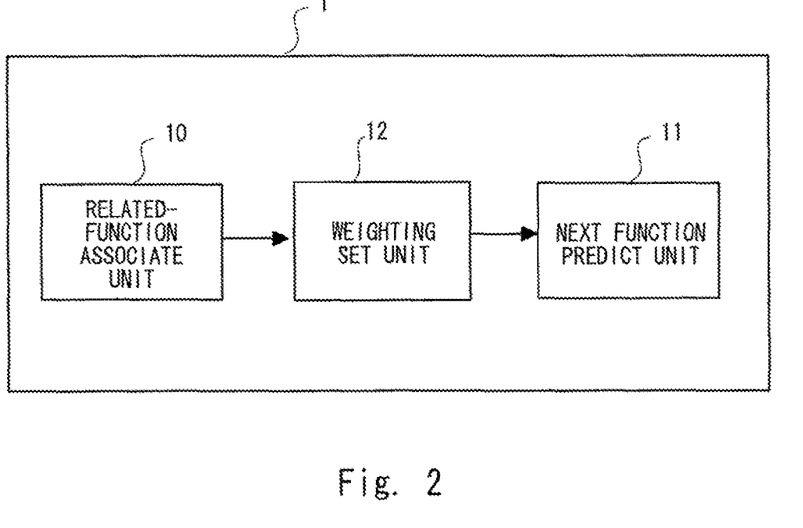
FIG. 2 is a diagram showing an overview of the mobile communication terminal of the embodiment of the present invention.

FIG. 2 is a diagram showing an overview of the mobile communication terminal of the embodiment of the present invention. The mobile communication terminal 1 is configured to include a related-function associate unit 10, a weighting set unit 12, and a next function predict unit 12. The related-function associate unit 10 associates the function executed by user operation with the function which is executed next. Specifically, when a function of making a phone call (function 5) and a function of registering the phone number of a caller in an address book (function 1) are successively executed, the related-function association unit 10 associates the function 5 with the function 1. The weighting set unit 12 sets a weighing value y to a combination of the executed function and the next executed function so that a lager weighing value is given to a newer executed combination. When the user newly selects any one function, the next function predict unit 11 causes the display unit 2 to display preferentially the functions, whose weighing values y given by the weighting set unit 12 are large, among the next executed function associated with the executed function. The related-function associate unit 10, the weighting set unit 12, and the next function predict unit 11 are provided in the CPU 7. Hereinafter, the above configuration will be explained in more detailed manner.

Figure 3:
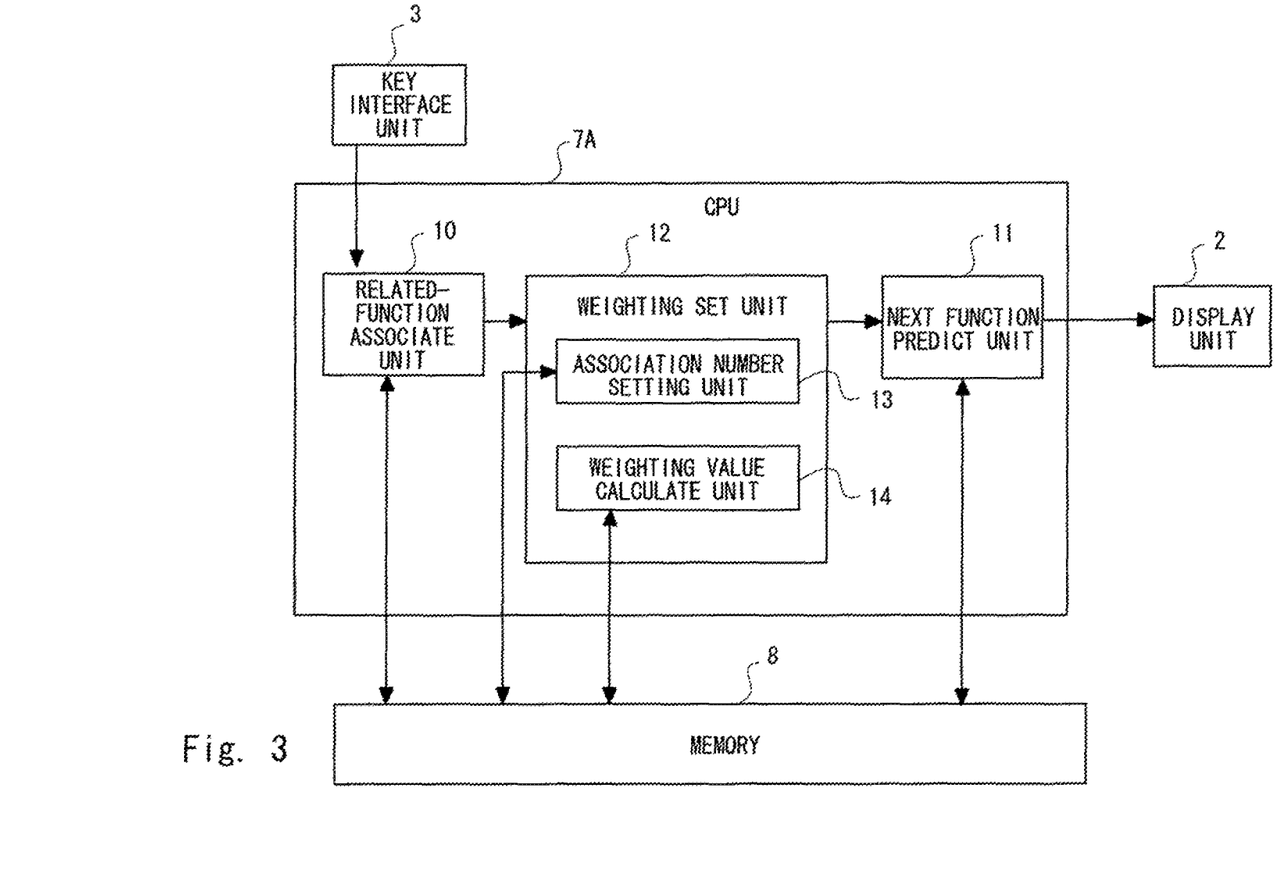
FIG. 3 is a diagram showing an exemplary configuration of a CPU in the mobile communication terminal of the embodiment of the present invention.

FIG. 3 is a diagram showing a detailed configuration of a CPU 7. As described above, the CPU 7 is configured to include the related-function associate unit 10, the weighting set unit 12, and the next function predict unit 11. The related-function associate unit 10 associates the executed function executed by the user with the next executed function executed by the user after the executed function in succession, and memorizes these associated functions. The weighting set unit 12 includes the association number setting unit 13 and the weighting value calculate unit 14. The association number setting unit 13 gives an association number for the combination of the executed function and the next executed function. The weighting value calculate unit 14 adds up the association numbers of the combinations of the same executed function and the same next executed function, which are given by the association number setting unit 13, and gives the added value as the weighting value y of the combination.

Figure 4:
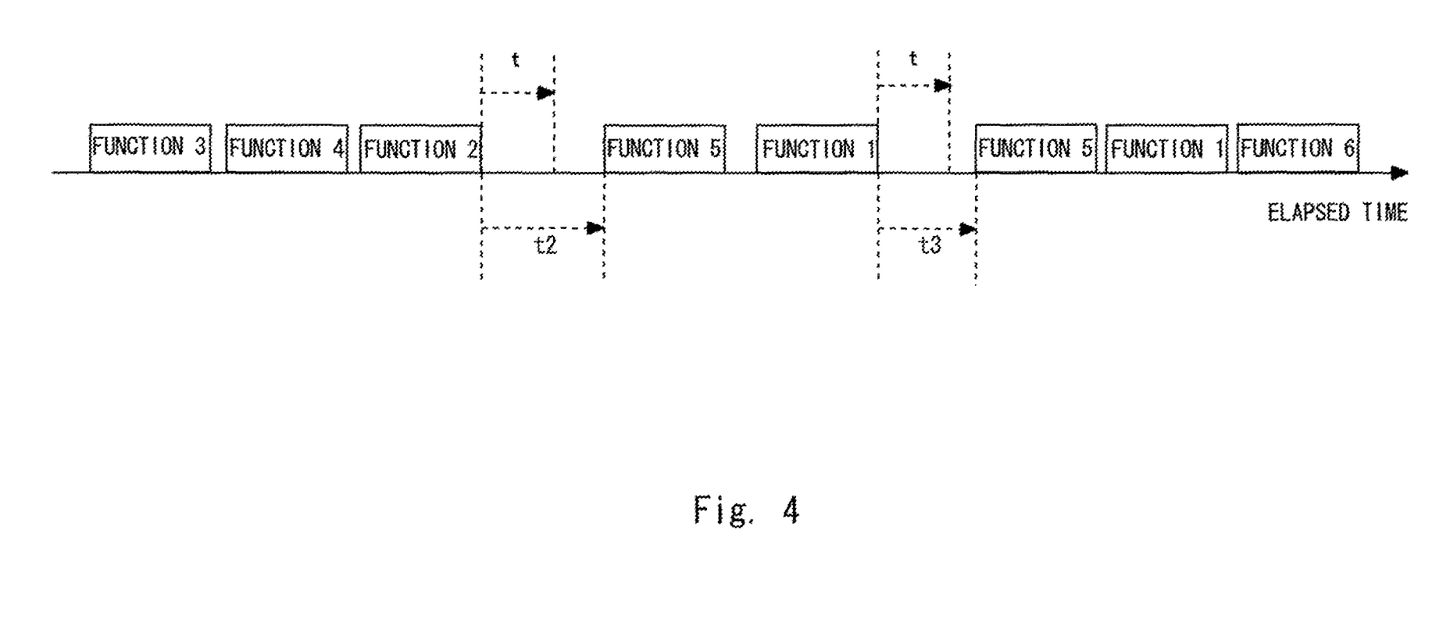
FIG. 4 is a diagram showing functions which are executed by the mobile communication terminal.

Here, to make an explanation with a specific example, it is assumed that a series of operations is executed, in which for example the user takes a photo of a landscape by using a camera installed in the mobile communication terminal 1, combine a taken picture image with a frame, and sends a e-mail with the attached picture image which the frame is combines with. As shown in FIG. 4, in the mobile communication terminal 1, a photo taking function (function 3), a frame combining function (function 4) of combining a taken picture image is combined with the frame, and a e-mail sending function (function 2) of transmitting e-mail to which the picture image combined with the frame is attached, are sequentially executed according to the user operation.

Figure 5:
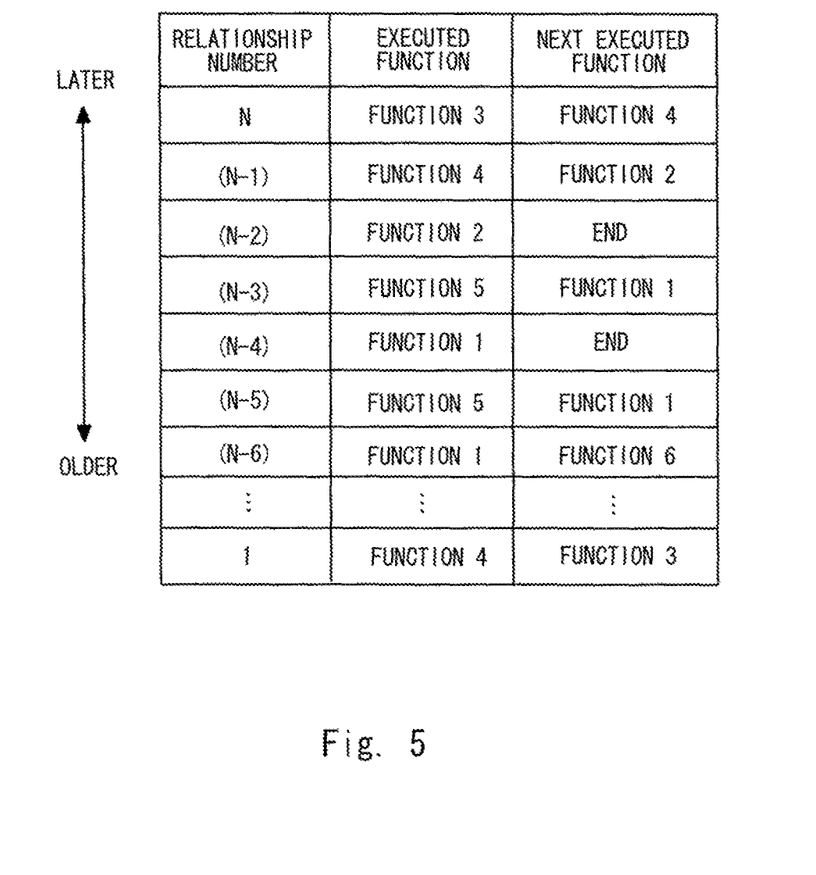
FIG. 5 is a table showing the relationship between the executed function and the next executed function, which is generated by a related-function associate unit.

The related-function associate unit 10 sequentially associates the functions which are executed before and after, and memorizes the executed functions. As shown in FIG. 5, for the series of executed functions, the related-function associate unit 10 associates the photo taking function (function 3) with the frame combine function (function 4) as the executed function and the next executed function, and memorizes the associated functions. The related-function associate unit 10 associates the frame combine function (function 4) with the e-mail sending function (function 2) respectively and memorizes the associated functions. Further, as shown in FIG. 4, the related-function associate unit 10 monitors a time t2 from when processes of the e-mail sending function (function 2) finishes to when the next executed function (function 5) is selected. When the next executed function is not selected after a predetermined time t, the related-function associate unit 10 determines that there is no relationship between the previously executed e-mail sending function (function 2) and the next executed function (function 5) executed after that. As shown in FIG. 5, the related-function associate unit 10 associates the last selected e-mail sending function (function 2) with information representing an end of the series of operations, and memorizes them.

Next, as shown in FIG. 4, assume that after the time t2 has elapsed after the user executed the series of functions of sending the e-mail with the attached picture image as described above, the user executes another series of operations including, for example, entering a phone number using the key interface to make a phone call, and then registering the phone number of the person to which the user made the phone call in an address book. Note the time t2 is longer than the predetermined time t. As shown in FIG. 4, in the mobile communication terminal 1, after the time t2 has elapsed after processes of the e-mail sending function (function 2) were finished, the call function (function 5) is executed and then the function of registering in the address book (function 1) is executed next.

As shown in FIG. 5, the related-function associate unit 10 newly associates the call function (function 5) executed after the time t2 with the function (function 1) of registering the phone number of the person to which the user made the phone call in the address book and memorizes the associated functions. Then, if the next function is not executed before a predetermined time t has elapsed after the processes of the function (function 1) of registering in the address book was completed again, the related-function association unit 10 determines the operations from the function 1 to the function 5 to be a series of operations. The related-function associate unit 10 associates the last executed function 1 of registering in the address book with information indicating an end of the series operation, and memorizes them. When the next function 5 is selected after a time t3 after processes of the function of registering in the address book (function 1) finishes, the related-function associate unit 10 associates the executed function (function 5) with the next executed function (function 1) again and memorizes them. Note the time 3 is longer than the time t.

In this way, a relationship table shown in FIG. 5 is generated by processes of the related-function associate unit 10. Data associating the functions executed before and after is memorized in the memory 8, and is sequentially updated at every time when the function is executed. In the relationship table, N sets of relationships (N is a predetermined number) are recorded. One of association number is given for the combination of the executed function and the next executed function. As referred later, the association number is assigned by the weighting set unit 12. As for the association number, the largest value N is assigned to the latest executed function. Further, as the combination gets older, it is assigned with a smaller association number one by one. In the relationship table, while the oldest combination is deleted in succession as, the latest combination is recorded. That is, the relationship table always records N sets of the latest combinations.

The weighting set unit 12 is configured to set a larger weighting value to a newer selected combination. As shown FIG. 5, the association number setting unit 13 assigns a value to a combination of the executed function and the next executed function in such a manner that the newer the combination is, the larger value the combination is assigned with. For example, when the memory 8 memorizes N sets of the combinations, a value of N is assigned to the latest executed combination, and a value of (N−1) is given to the executed combination which is executed before the combination of the last executed functions, . . . , and a value of 1 is given to the combination of the oldest executed functions. In the other words, the combinations of functions which are executed before and after each other move down successively with respect to the association numbers 1 to N set by the association number setting unit 13.

Figure 6:
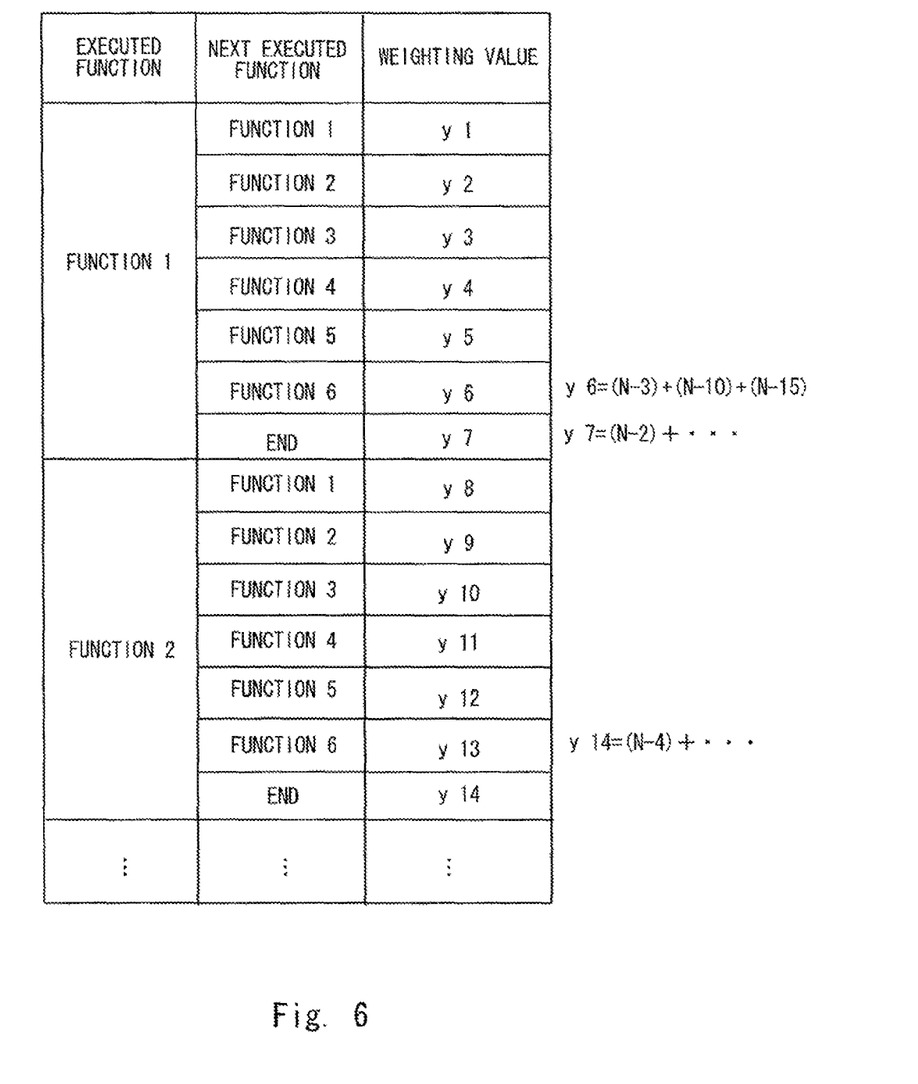
FIG. 6 is a table showing a relationship between each combination and a weighting value, which is generated by a weighting set unit.

The weighting value setting unit 14 adds up the association numbers of the same combinations of the same executed function and the same next executed function in the relationship table as shown in FIG. 5, and assigns an added value as the weighting value y of the combination. The weighting values y set by the weighting value setting unit 14 are memorized as the weighting table shown in FIG. 6 in the memory 8. For example, as shown in the relationship table in FIG. 5, assume that there are three combinations in which the firstly executed function is a function 1 and the secondary executed function is a function 6. Then, if the association numbers (N−3), (N−10) and (N−15) are assigned to the respective combinations, the weighting set unit 14 sets a value of (N−1)+(N−10)+(N−15) as a weighting value y6 to the combination in which the firstly executed function is function 1 and the secondary executed function is function 6 as shown in FIG. 6. In this way, the weighting value setting unit 14 calculates the weighting value y by adding the association numbers of the combinations of the same executed functions in the past. Because the larger association number is assigned to the newer combination, the larger weighting values y is given to the combination which is executed more times in recent days.

The weighting set unit 12 is not limited to the configuration described above. The other configurations may be adopted, provided that the larger weighting value is given to the newer executed combination.

The next function predict unit 11 causes the display 2 to display the related-functions which are predicted to be selected by the user. When the user newly selects a function to be executed, the next function predict unit 11 refers to the weighting table shown in FIG. 6 and causes the display unit 2 to preferentially display the next executed functions having a large weighting value y among the next functions associated with the latest function executed by the user. For example, when the user newly selects the function 1, the next function predict unit 11 extracts the functions having larger weighting value y1 to y6 from the next executed function 1 to 6 corresponding to the function 1, and causes the display 2 to display them preferentially. The number of the preferentially displayed functions may be one. It may also be designed to display more than one the functions in the order of the weighting value y from the largest to smallest.

Figure 7:
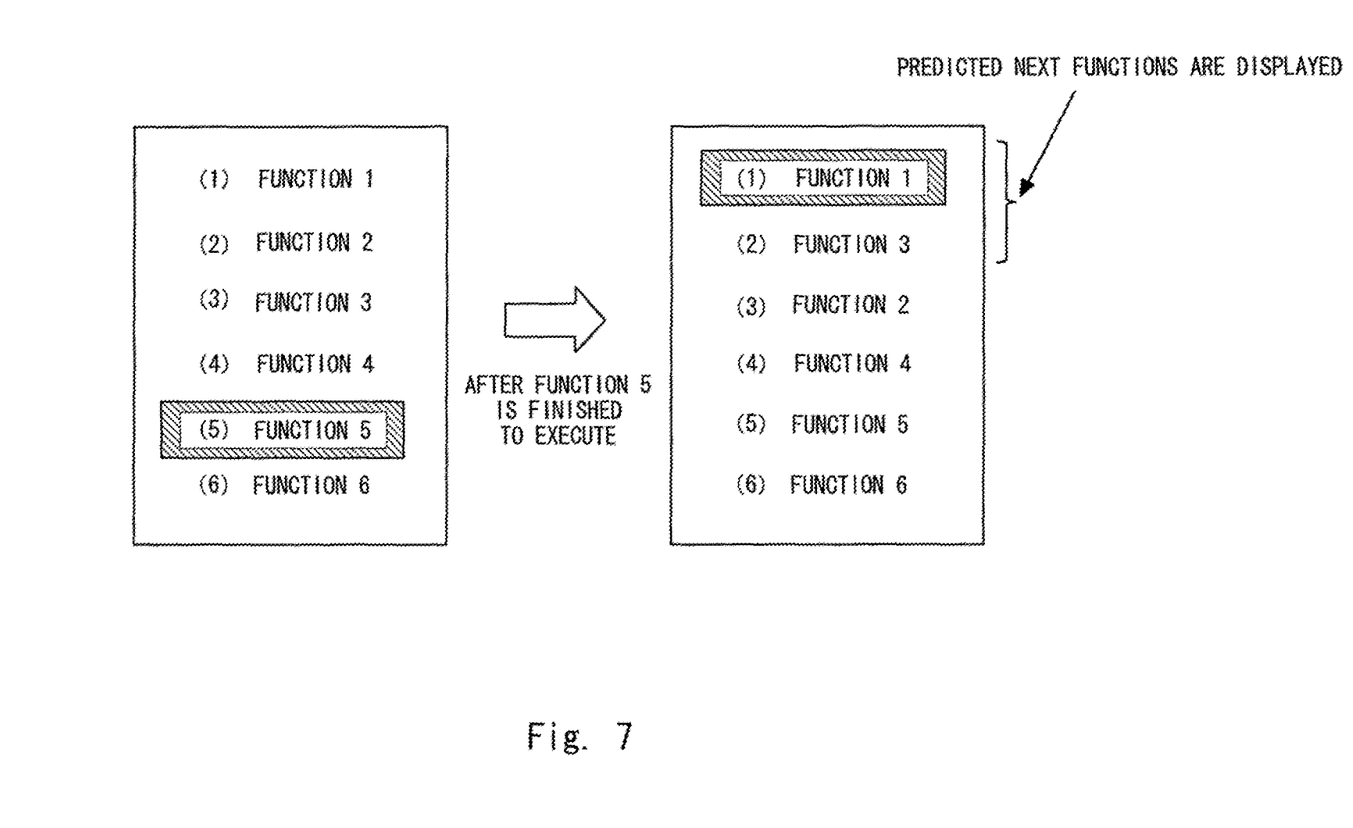
FIG. 7 is a drawing of a display unit in the state of displaying a function which is predicted to be selected next.
Figure 8:
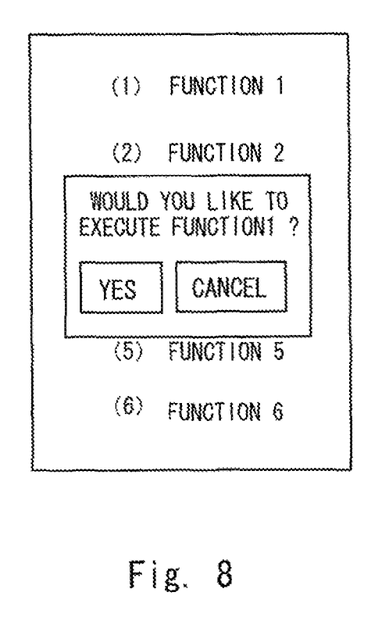
FIG. 8 is a drawing of another example display unit in the state of displaying the function which is predicted to be selected next.

Next, a specific display method in which the items are displayed preferentially will be explained. As shown in FIG. 7, when the user selects the function 5 and the processes of the function 5 finish, the next function predict unit 11 executes a process to preferentially display the function 1 having high association with the function 5. In this case, as shown in FIG. 7, when the processes of the function 5 finishes, the function 1 which is predicted to have high association with function 5 is displayed in an upper area of the display unit 2. When the user wants to execute a frequently-executed series of functions in which the function 1 is executed after when the function 5 is executed, the user can select easily the series of items by selecting the function 1 which is preferentially displayed. In this way, the user does not need to search for the desired item by repeatedly making selections from the top menu, and can easily selects a frequently-used function by selecting the function the user wants to use next from among the preferentially displayed items.

As shown in FIG. 5, in a method of displaying the function predicted to be selected by the user in the display unit 2, a pop-up window 2a can be used. By displaying the items which are predicted to be selected by the user in the pop-up window 2a, the user can more easily select the function the user wants to execute next.

As described above, in the mobile communication terminal 1 according to the present embodiment, functions included in a series of functions that are frequently used by the user are associated with one another as a combination of preceding and subsequent functions and memorized. After the weighting value y is assigned to each combination, the function having a larger weighting value y is preferentially displayed in the display unit 2. The related-function can be displayed to the display unit 2 according to the latest usage of the user. In the present embodiment, because the larger weighting value y is set to the combination of the newer executed functions, the related-function which is predicted to be selected by the user can be displayed in the display unit according to not only the frequency of selecting but also a time period of selecting. In this way, the user can selects functions which are displayed according to the latest usage of the user. For example, when the user does not use the related-function in recent days, which the user frequently use in the past, the mobile communication terminal according to the present embodiment can preferentially displays functions which the user frequently uses in the recent days without displaying the functions which the user frequently use in the past. Therefore, the user can select the function at once which is displayed in the response to the latest usage of the user at once, and instruct the mobile communication terminal to execute the desired function.

In the explanation of the present embodiment, the association number setting unit 13 sets the association numbers while decreasing the association number one by one in the order from the latest combination to the oldest combination. However, the association number to be set is not limited by the above example. For example, the association numbers may be changed by two or more than at a time for the preceding and subsequent combinations. Further, the association numbers may be changed by a value number less than one to the preceding and subsequent combinations. The difference between the association numbers of the preceding and subsequent combinations is not limited to constant values in the order from the latest to the oldest. For example, when the difference between the association numbers of the preceding and subsequent combinations may be gradually changed from the latest combination to the oldest combination and an advantageous of the invention can be still obtained.

In the explanation of the present embodiment, the weighting value is set for two functions which are executed in series. However, the weighting value is not limited to be set for the combination of functions executed before and after each other. For example, when the weighting value y may be set for the combination of a series at more than two functions to be executed, and the advantageous effect of the present invention can be still obtained.

The present invention not limited by the above described embodiments, and various modifications can be applied within the spirit and scope of the invention.

This application is the National Phase of PCT/JP2008/067057, filed Sep. 22, 2008, which is based upon and claims the benefit of priority from Japanese patent application No. 2007-306820, filed on Nov. 28, 2007, the disclosure of which is incorporated herein in its entirety by reference.

Industrial Applicability

The invention can be applied to a mobile communication terminal in which a menu is displayed for the user to select a function that the user wants to execute from functions installed in the mobile communication terminal, and a menu display method in the mobile communication terminal.

The invention claimed is:

1. A mobile communication terminal comprising:
a related-function associate unit that associates and combines a first function selected and executed by a first operation by a user with a second function selected and executed by a second operation by the user executed after the first operation, the first function being a previously executed function and the second function being a next executed function;
a weighting set unit that sets a larger weighting value to a newer combination of the previously executed function and the next executed function associated by the related-function associate unit; and
a next function predict function unit that, when a third function is selected by a third operation by the user, causes a particular function associated as the next executed function in a combination to which a larger weighting value is set to be displayed in preference to other functions among combinations in which the third function is the previously executed function.

2. The mobile communication terminal according to claim 1, wherein the weighting set unit comprises:
an association number setting unit that assigns a larger association number to a newer combination associated by the a related-function associate unit; and a weighting value calculate unit that calculates the weighting value by adding the association numbers assigned to the combination of the executed function and the next executed function, the functions being executed in a predetermined period.

3. The mobile communication terminal according to claim 1, wherein the related-function associate unit associates the executed function and information indicating an end of a series of functions if the user does not select a new function after a predetermined time elapses after processes of the executed function finish.

4. A menu display method in a mobile communication terminal comprising:

associating and combines a first function selected and executed by a first operation by a user with a second function selected and executed by a second operation by the user executed after the first operation, the first function being a previously executed function and the second function being a next executed function;

setting a larger weighting value to a newer combination of the previously executed function and the next executed function; and when a third function is selected by a third operation by the user, causing a particular function associated as the next executed function in a combination to which a larger weighting value is set to be displayed in reference to other functions among combinations in which the third function is the previously executed function.

5. The menu display method in the mobile communication terminal according to claim 4, further comprising:

assigning a larger association number to a newer combination associated by the related-function associate unit; and calculating the weighting value by adding association numbers assigned to the combination of the executed function and the next executed function, the functions being executed in a predetermined period.

6. The menu display method of the mobile communication terminal according to claim 4, further comprising:

associating the executed function and information indicating an end of a series of functions, if the user does not select a new function after a predetermined time elapses after processes of the executed function finishes.

* * * * *